Jan. 30, 1962 L. H. MORIN ETAL 3,018,519
APPARATUS FOR MOLDING PLASTIC INSERT
IN THREADED LOCK NUT BLANKS
Filed March 6, 1958 2 Sheets-Sheet 1
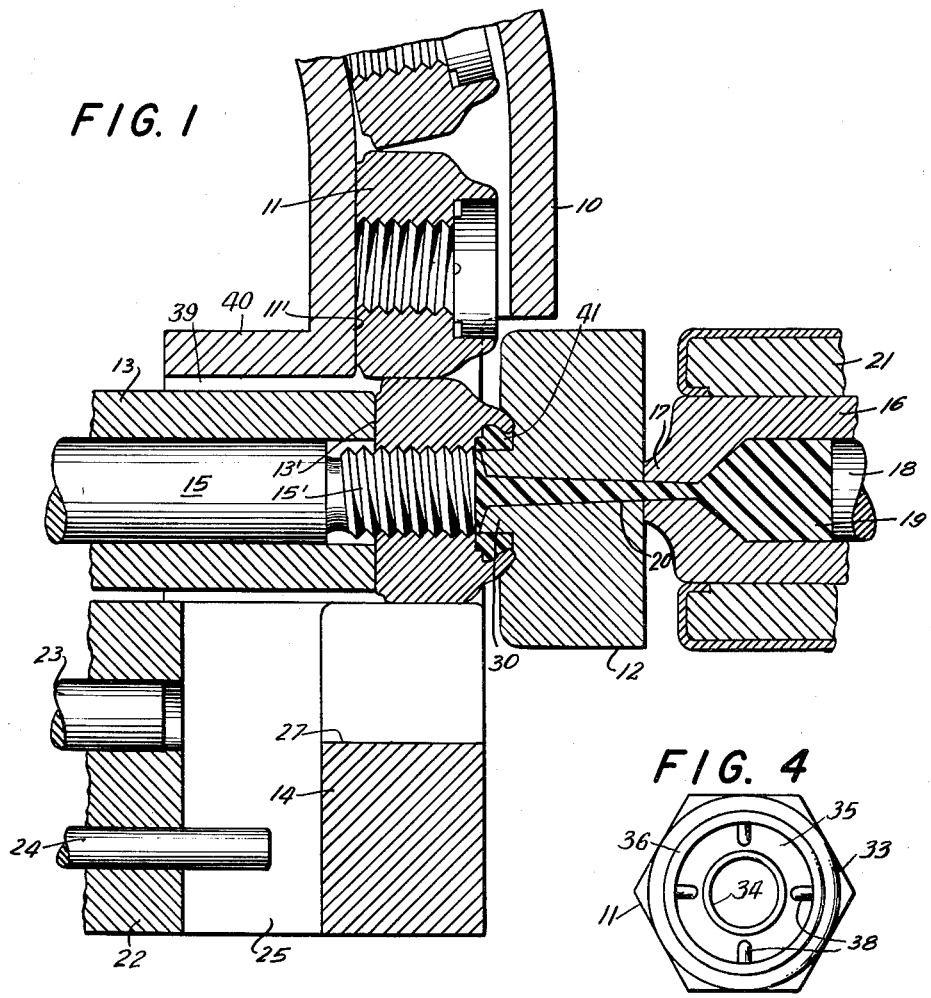
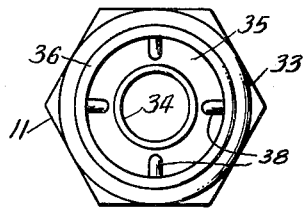
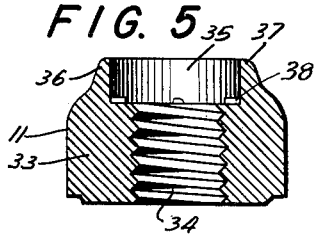
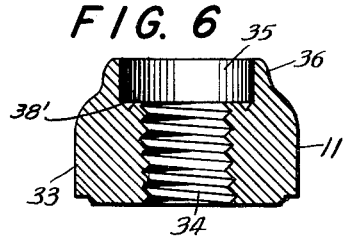
INVENTORS.
LOUIS H. MORIN
OTTO GRIES
BY
*Howard Thompson*
ATTORNEY Jan. 30, 1962  L. H. MORIN ETAL  3,018,519
APPARATUS FOR MOLDING PLASTIC INSERT
IN THREADED LOCK NUT BLANKS
Filed March 6, 1958  2 Sheets-Sheet 2
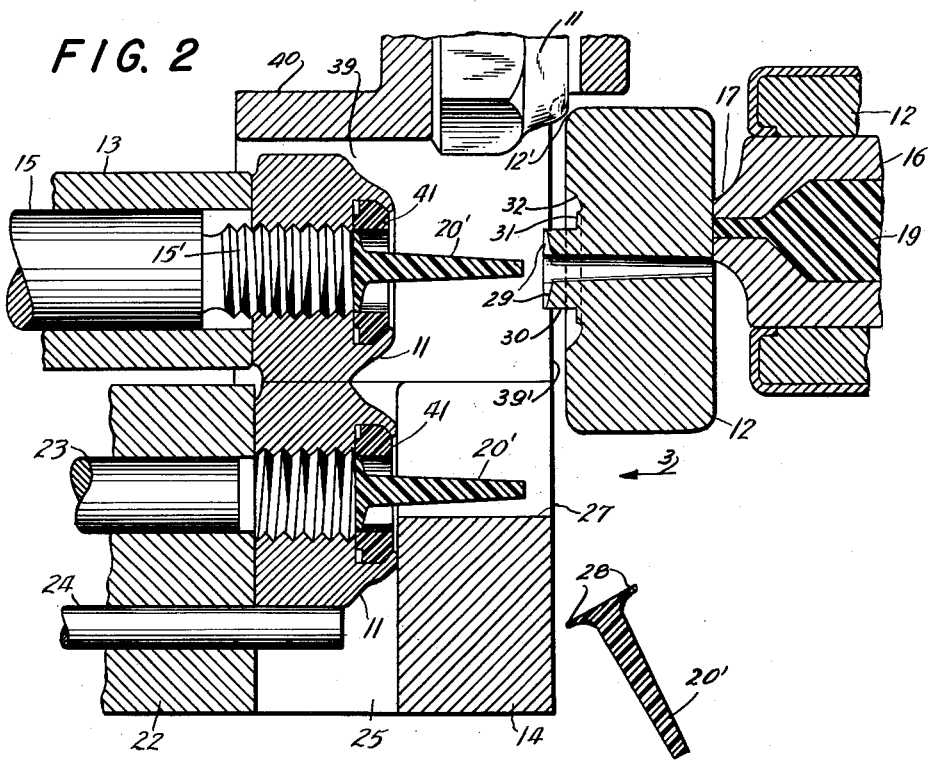
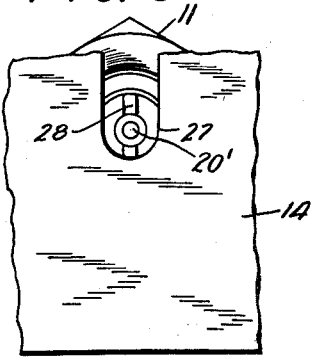
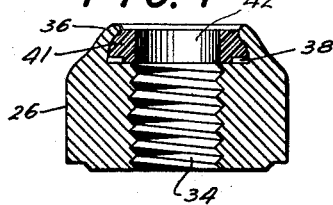
INVENTOR.
LOUIS H. MORIN
OTTO GRIES
BY
Howard T. Thompson
ATTORNEY

United States Patent Office 3,018,519
Patented Jan. 30, 1962

3,018,519
APPARATUS FOR MOLDING PLASTIC INSERT IN THREADED LOCK NUT BLANKS
Louis H. Morin, Bronx, and Otto Gries, New Rochelle, N.Y.; said Gries assignor, by mesne assignments, to Coats & Clark Inc., a corporation of Delaware
Filed Mar. 6, 1958, Ser. No. 719,654
4 Claims. (Cl. 18—36)

This invention relates to apparatus for forming what are generally referred to as lock nuts of the type and kind employing a molded plastic washer lock element in the outer end portion of a nut body for frictionally and tensionally retaining the nut in operative position when the nut is in use.

More particularly, the invention deals with apparatus for producing lock nuts of the character described, wherein threaded nut blanks are first shaped or formed and then filled with a plastic washer in the formed portion of the blank; whereupon, the product is then trimmed to remove the gate in formation of the resulting end product.

Still more particularly, the invention deals with an apparatus for forming lock nut structure of the character described, wherein the nut blank is shaped to form key means for retaining the plastic washer element against rotation in the nut body when the nut is in use.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view showing the shaping of a nut blank and molding a plastic washer element in the shaped or formed portion of the blank.

FIG. 2 is a view, similar to FIG. 1, showing the parts in a different position and indicating one of the nuts at the trimming station and also diagrammatically illustrating discharge of a trimmed nut, including the removed gate.

FIG. 3 is a detail view looking in the direction of the arrow 3 of FIG. 2.

FIG. 4 is a plan view of one of the nut blanks which are employed.

FIG. 5 is a sectional view through the nut blank shown in FIG. 4.

FIG. 6 is a view, similar to FIG. 5, showing a modification; and

FIG. 7 is a sectional view through the nut, as completely formed.

In FIGS. 1 and 2 of the drawing, 10 represents a hopper, through which nut blanks 11 are gravity fed for positioning between a die member and forming element 12, a forming plunger 13, a stop lug 14 and an insert 15, which forms a die part when the latter is in its operative position.

Arranged at one side of the member 12 and movable relatively thereto, as noted in considering FIGS. 1 and 2, is an injection cylinder 16, having a discharge nozzle 17. At 18 is shown the plunger or piston for pressure discharge of plasticized material 19 from the cylinder through the nozzle and into the gate 20 which extends through the die member 12. At 21 is diagrammatically illustrated the electric heating means for maintaining the material 19 at the proper temperature at all times.

Movable in a suitable plate or frame 22 is a trimming punch 23 and stop rod 24, the plate being spaced sufficiently from the stop lug 14 to form a discharge chamber 25, through which the finished end product 26 is free to drop into a suitable receptacle, as diagrammatically illustrated in FIG. 2 of the drawing.

The stop lug 14 has a gate or sprue discharge slot 27, as clearly noted in FIG. 3 of the drawing, and one of the discharged sprues or gates 20' is indicated in its discharged position in FIG. 2 of the drawing. At this time, it is well to point out that the laterally extending portions 28 of the gate or sprue are in the form of narrow ribs which are free to pass through the slot 27. These extending portions 28 are generally referred to as runners and are formed by recesses 29 in the surface of the die member 12 or the projection 30 thereof.

The projection 30 forms part of the mold cavity of the die member 12, the other portion thereof being formed by the shoulder 31. Note FIG. 2. Outwardly of the shoulder 31 is a curved annular workpiece forming recess 32 for shaping the workpiece when positioned at the forming and molding station, as later described, With the present construction, the nut blanks 11 are generally of the structure shown in FIGS. 4 and 5 of the drawing and comprise a conventional nut body 33 of hexagon, octagon or other contour, having a threaded bore 34 opening through the lower end of the nut body and into an enlarged chamber 35 at the upper end portion of the nut body. The chamber 35 is bordered by a reduced wall portion 36, having a rounded outer end 37.

At the base of the chamber 35, around the threaded bore, are a plurality of upwardly projecting key lugs 38, as clearly noted in FIG. 4 of the drawing.

In FIG. 6 of the drawing is shown a slight modification, in which like references identify like parts and substituted for the key lugs 38 are a plurality of key recesses 38'.

In carrying the method into effect, and assuming that a nut blank has been moved into the position against the stop lug 14 with the end 13' of the forming plunger 13 substantially in alignement with the surface 11' of the hopper 11 and the die part 15 which is threaded and rotatable in its retracted position, the operation is as follows.

The forming plunger 13 is moved, under pressure, in the direction of the die member 12 to engage that nut blank and to move the wall portion 36 of the blank into the forming recess 32 to shape this wall portion in the manner illustrated in FIG. 1 of the drawing; whereupon, the die part 15 is rotated and moved toward the nut blank, so that the threaded portion 15' thereof will engage the threaded bore 34 and this operation continues, until the threaded portion 15' touches the end surface of the projection 30.

Upon completing the above operation, the nozzle 17 is brought from the position of FIG. 2 into the position of FIG. 1 and the piston or plunger 18 is actuated to pressure discharge the plastic material 19 into the gate 20 and, thus, into the cavity, which is now defined between the two die parts 15 and 12, the formed wall portion 36, and the base of chamber 35. Owing to the fact that the end face of threaded portion 15' is in alinement or flush with the base of chamber 35, no plastic material can enter the threaded portion of the nut. The threads thus remain clean.

Upon completing this operation, the nozzle 17 is moved into the position of FIG. 2, thus severing the gate 20. The plunger 13, together with the die part 15, are moved into the position of FIG. 2, such movement effecting a withdrawal of the tapered gate 20 from member 12 and placing the nut in position to pass into the chamber 25. At this point the plunger or sleeve 13 is held stationary and the part or core 15 is rotated to unthread the same from the nut, it being understood that the nut is keyed against rotation in the chamber 39 of guide extension 40, as by disposing at least two opposite walls or surfaces of chamber 39 in such proximity to corresponding sides of the nut as to prevent its rotation. The freed nut is allowed to drop into the position against the stop rod 24, as noted in FIG. 2, which position can be termed a gate trimming station. Then, upon actuation of the trimming punch 23, the gate 20' is removed, and withdrawal of the rod 24 allows the trimmed nut to drop into a suitable receptacle, not shown.

It will be apparent that the resulting end product 26, shown in section in FIG. 7, will have a plastic washer element 41 with a bore 42 therein substantially equal in diameter to the pitch diameter of the threads of the threaded portion 34.

From the standpoint of apparatus, of which the present illustrations are purely diagrammatic, it will appear that one of the distinctive features of this apparatus and the method disclosed resides in the fact that very simple die parts are employed, namely the parts 12 and 15. As indicated, the balance of the mold cavity, defining the structure of the resulting plastic washer, is formed by the annular chamber between the die extension 30 and the formed wall portion 36. It will, thus, be apparent that this simple die structure minimizes the operative mechanism employed in the machine.

It is preferred that the extension 30 of the die member 12 be tapered outwardly to a slight extent, so as to be removable freely from the molded washer when the parts are separated, as shown in FIG. 2. No attempt, however, is made to show this slight taper, neither in the part 30, nor bore of the washer.

Considering FIG. 2 of the drawing, it will appear that the die member 12, including the cylinder 16, has a slight movement so that, in the operation of moving the formed workpiece from the forming station to the trimming station, this slight movement will advance the die member 12 sufficiently to bring the corner portion 12', note FIG. 2, in position to hold the next successive blank 11 against movement into the forming station. This position is maintained until such time as the formed product has dropped into the trimming station; whereupon, the die member 12 is retracted to allow the next successive nut blank to drop into position upon the surface of the stop lug 14.

Die member 12 can be maintained stationary by providing other suitable stop means for supporting the lowermost blank (FIG. 2) in hopper 10. For example, such means may comprise an intermittently movable rod which passes through an opening in the hopper to engage either the lower side or the bore of the lowermost blank, the movement of the rod being correlated with that of plunger 13 and part 15.

The side walls of the chamber 39, which engage flat opposed sides of the nut, extend sufficiently at the forming station to retain the nut against rotation in the operation of attaching the threaded portion 15' of the die part 15, the extension of one of the side walls being indicated as terminating at 39', as noted in FIG. 2 of the drawing.

The nut blanks 11 can be formed in any desired manner; preferably they are fashioned as die castings of materials which facilitate formation of the wall portions 36 in the manner disclosed. They may also be made as screw machine parts preferably of the form shown in FIG. 6. The washer 41 is preferably a plastic, particularly a resilient material such as nylon or other polyamide.

By way of summary, the method may be seen to comprise a forming and casting station, as illustrated in FIG. 1, where the wall portion 36 of the nut blank is formed or bent from its original vertical position to an inwardly bowed shape, and where the plastic insert or washer 41 is cast within the chamber 35 of the nut blank. The nut blank acts as a die, and it will be noted that no separate cooling means are employed because the nut blank, since it is used only once as a die, acts as its own chilling medium. The member 12 comprises the die proper, having a casting material inlet leading into a die cavity. Although shown only in section, member 12 may have a circular or square or other suitable outline shape.

From the forming and casting station the nut is moved to a stripping or unthreading station, illustrated by the position of the upper nut in FIG. 2, where the part or core 15 is removed from the nut. Following such removal, the nut passes to the gate trimming station, as illustrated by the position of the lower nut in FIG. 2.

As may be apparent, while one nut is being trimmed, a succeeding nut blank can be introduced to the forming and casting station. Also, the unthreading of the part 15 at the unthreading station can be so correlated that the unthreading action is completed to let the freed nut fall to an empty trimming station and be retained by the stop means 24.

In considering the end product, it will appear that the washer 41 is firmly housed within the inturned wall portion 36 and that the key lugs 38 retain the washer against rotation.

It will be apparent that, with the present method, end products of the type and kind under consideration can be economically produced.

Among other advantages the nut blanks can be economically cast on high speed casting machines, and may be tapped separately, or the tapping may be carried out at the same time as the blank is formed using the method disclosed in U.S. Patent No. 2,579,952. Further economies are provided by the gravity feed of the blanks. The use of the stationary or substantially stationary die member 12 represents a considerable simplification over a conventional pair of dies that are conventionally moved towards and from each other.

Having fully described our invention, what we claim as new and desire to secure by Letters Patent is:

1. An apparatus for producing lock nuts of the character described, comprising a forming and molding station having a combination forming and molding die with a gate passage extending through the die, a forming plunger and threaded insert movable toward and from said die, said insert being rotatable and longitudinally movable relative to said plunger and means for holding a nut blank against rotation, means for delivering nut blanks to said station in a position between the die and said plunger and insert, each nut blank having a threaded bore and an enlarged chamber at one end, bordered by a reduced wall, the chamber and wall facing said die, when the blank is positioned at said station, said forming plunger being movable to advance the nut blank onto the die in shaping the reduced wall of the blank to partially close said chamber, said insert being moved longitudinally and rotated while holding the nut blank against rotation to thread the insert into the bore of the nut blank to a position adjacent to the surface of the die positioned in said chamber, means for pressure injecting heated plastic material through the gate of said die into the cavity formed by said chamber, die and surface of the insert to form a plastic washer in said chamber, a trimming station adjacent said first named station, the trimming station including means for definitely positioning a nut blank at the trimming station, with the bore of the nut blank in alinement with a trimming punch at said station, the nut blank moving to the trimming station upon release of the insert from the threaded bore of the blank, and said trimming punch being actuated to remove the gate portion formed integrally with said washer from the washer to produce the resulting lock nut end product.

2. A structure as defined in claim 1, wherein the chambered portion of the nut blank is fashioned to form means keying the plastic washer against rotation in the nut blank.

3. An apparatus for producing lock nuts from nut blanks each having a threaded bore and having a chamber at one end larger in diameter than the diameter of said bore and bordered by a peripheral wall reduced in thickness compared with the thickness of the wall surrounding said threaded bore, said apparatus comprising a forming and molding die at a forming and molding station, said die having a gate passage extending through the die, a die extension at its end nearest the position of the blank at said station and a forming recess around said extension to receive the peripheral wall of the blank, means for conducting the blank successively to said station opposite said die, means for moving said die and said blank at said station relatively towards each other in positions to cause said die extension to pass into said chamber and to define an annular mold cavity between said extension and said wall, said relative movement causing the rim section of the wall to be turned radially inwardly, means at said station for holding said blank against rotation, a rotatable and longitudinally movable threaded insert at said station adapted to be screwed into the bore of the blank when said blank is at said station and to be unscrewed from the bore after relative movement of the die and blank away from each other, means for injecting plastic material in flowable form through said gate passage and into said cavity to form a lock washer therein, said insert operating when screwed into the blank to fill up said bore and to prevent thereby the plastic material from flowing into contact with the threads in said bore during injection of plastic material into said mold cavity, and means for moving said die and said blank relatively apart.

4. An apparatus as described in claim 3, comprising means for conducting the blank to a trimming station after said die and said blank have been moved relatively apart and said insert has been unscrewed from the bore, and a trimming punch at said station reciprocable through the bore of the blank for trimming the gate material from the lock washer.

References Cited in the file of this patent

UNITED STATES PATENTS

| | | |
|---|---|---|
| 2,286,336 | Brooke | June 16, 1942 |
| 2,348,308 | Richardson | May 9, 1944 |
| 2,367,303 | Morin | Jan. 16, 1945 |
| 2,385,927 | Mason | Oct. 2, 1945 |
| 2,407,314 | Mason | Sept. 10, 1946 |
| 2,421,105 | Warren | May 27, 1947 |
| 2,672,173 | Chantler | Mar. 16, 1954 |